United States Patent
Hobbs et al.

(10) Patent No.: US 8,764,898 B2
(45) Date of Patent: Jul. 1, 2014

(54) ADHESIVE COMPOSITION FOR THE NON-PERMANENT ADHESION OF FINGER AND THUMB PICKS FOR THE PLAY OF STRINGED INSTRUMENTS

(76) Inventors: George Wayne Hobbs, New Carlisle, OH (US); Terry Hobbs, New Carlisle, OH (US)

(*) Notice: Subject to any disclaimer, the term of this patent is extended or adjusted under 35 U.S.C. 154(b) by 103 days.

(21) Appl. No.: 13/480,744

(22) Filed: May 25, 2012

(65) Prior Publication Data
US 2013/0312639 A1 Nov. 28, 2013

(51) Int. Cl.
| C08L 89/00 | (2006.01) |
| C09D 189/00 | (2006.01) |
| C09J 189/00 | (2006.01) |
| C08L 1/00 | (2006.01) |
| C08L 3/00 | (2006.01) |
| C08L 5/00 | (2006.01) |
| C09D 101/00 | (2006.01) |
| C09D 103/00 | (2006.01) |
| C09D 105/00 | (2006.01) |
| C09J 101/00 | (2006.01) |
| C09J 103/00 | (2006.01) |
| C09J 105/00 | (2006.01) |
| C08L 93/00 | (2006.01) |
| C09D 193/00 | (2006.01) |
| C09J 193/00 | (2006.01) |
| C08L 3/02 | (2006.01) |
| C09D 103/02 | (2006.01) |
| C09J 103/02 | (2006.01) |

(52) U.S. Cl.
USPC ............... 106/205.71; 106/162.1; 106/205.4

(58) Field of Classification Search
USPC ............... 106/205.71, 162.1, 205.01, 205.4
See application file for complete search history.

(56) References Cited

U.S. PATENT DOCUMENTS

| 3,739,681 | A | | 6/1973 | Dunlop | |
| 4,625,616 | A | | 12/1986 | McVickers | |
| 4,993,302 | A | * | 2/1991 | Jonathan | 84/322 |
| 5,190,828 | A | * | 3/1993 | Katsumata | 428/447 |
| 6,846,977 | B2 | * | 1/2005 | Oskorep | 84/322 |
| 7,186,908 | B2 | | 3/2007 | Hodesh et al. | |
| 7,312,388 | B2 | * | 12/2007 | Oskorep | 84/322 |
| D607,920 | S | | 1/2010 | Bartel | |
| 2009/0139384 | A1 | * | 6/2009 | Bramucci | 84/322 |

OTHER PUBLICATIONS http://web.archive.org/web/20070504032843/http://www.wikihow.com/Make-Glue.*
Esquire Magazine, "Edward Van Halen is Alive", May 2012, vol. 157. No. 5, by David Curcurito, p. 120.
Steel Guitar Forum (http:/bb.steelguitarforum/com), "Picks, picks and more picks" (online discussion forum for players of steel guitars, banjos, dobros, etc), dates of entries (Jan. 28-Jan. 30, 2011), by Miscellaneous Authors, pp. 1-5.
Super Glue Blog, www.supergluecorp.com, "Record Holding Banjo Player Used Super Glue", Jul. 31, 2011.

* cited by examiner

*Primary Examiner* — James McDonough
(74) *Attorney, Agent, or Firm* — Thomas E. Lees, LLC

(57) ABSTRACT

A water-based non-permanent adhesive solution composition comprised of water, gum arabic powder, sodium benzoate, citric acid and denatured alcohol capable of being applied directly to the thumb and playing fingers for players of stringed instruments including, but not limited to, banjos, steel guitars, and Dobros. When applied to the thumb and playing fingers the solution quickly and safely binds the picks to the skin to prevent the picks from slipping or falling off during prolonged periods of play.

12 Claims, 3 Drawing Sheets

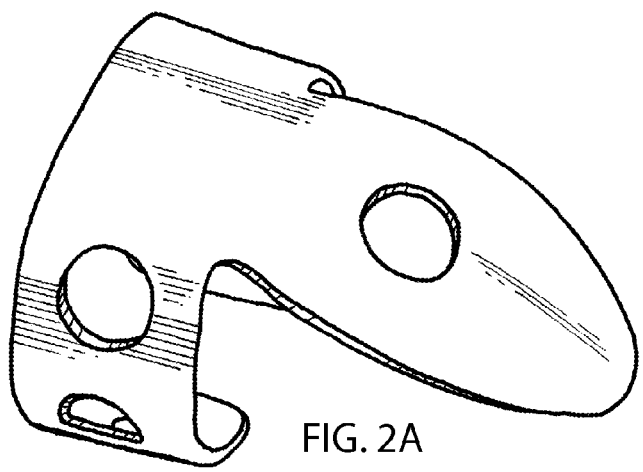
FIG. 2A
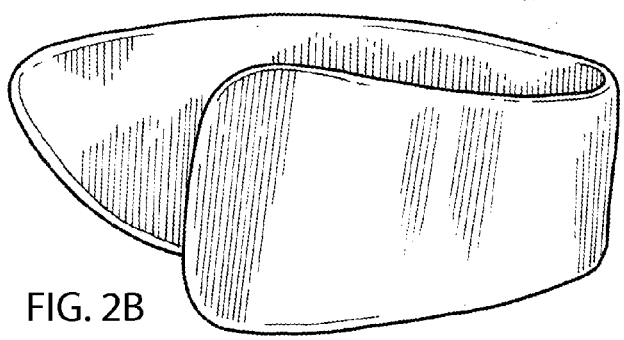
FIG. 2B
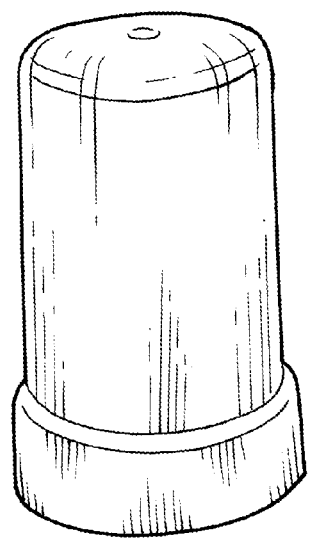
FIG. 1
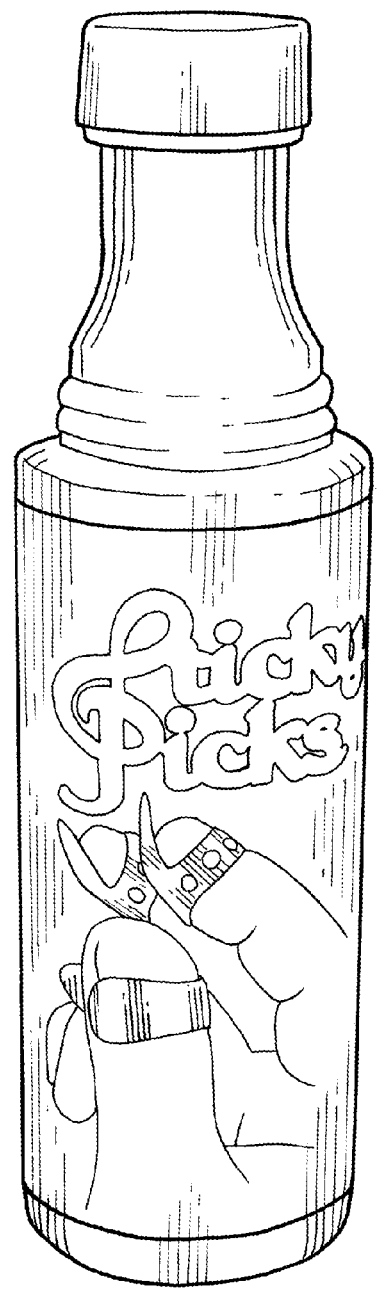

ADHESIVE COMPOSITION FOR THE NON-PERMANENT ADHESION OF FINGER AND THUMB PICKS FOR THE PLAY OF STRINGED INSTRUMENTS

FIELD OF THE INVENTION

The present invention disclosed here relates in general to the field of non-permanent water-based adhesives, more specifically adhesives for the purposes of maintaining plastic or metal picks on the fingers and thumbs of players of stringed instruments, including, but not limited to steel guitars, Hawaiian guitars, banjos and Dobros[1].

[1] "Dobro" is a registered trademark of Dopera, Edgar E, dba Original Musical Instrument Company, Inc.

BACKGROUND OF THE INVENTION

Professional and amateur players of stringed instruments such as guitars, steel guitars, Dobros, and banjos, struggle in keeping finger and thumb picks in place and stable while playing their instruments, specifically when playing for sustained periods of times. This is a particular concern for professional musicians whose livelihood depends on their ability to perform at a high level, consistently and without failure, sometimes several times on the same day.

There is a currently an unmet need to solve this long standing musicians' problem of picks slipping or being dropped during the play of these stringed instruments. To date, several commercially-available products or homemade solutions attempt to solve this problem with little success. Such solutions include ointments, rubber coated picks, physically-altered or modified picks and the use of tape. These existing items either a) attempt the application of a substance with some limited binding properties to the picks themselves or b) directly modify the picks to create a better grip between the finger or thumb and the pick. Such products have failed to consistently provide the adhesion needed, especially for professional musicians, and have sometimes actually negatively impacted the player's performance.

BRIEF DESCRIPTION OF THE INVENTION

The present invention relates to a novel adhesive composition of matter, and application thereof, of a water-based adhesive solution for the non-permanent bonding of finger and thumb picks to their respective playing fingers and thumbs used in the playing of stringed instruments. More particularly, the present invention relates to such an adhesive composition capable of temporarily bonding picks to the fingers and thumbs of musicians who play the banjo, steel or Hawaiian guitar, Dobro and like instruments that require both finger picks and thumb picks to pluck strings. The invention enables the player to perform at a professional level for extended periods of time without the picks falling off the fingers or thumb.

An object of the present invention is to provide the musician non-permanent, yet sustained, adhesion between his playing finger(s) and thumb with the corresponding finger and thumb picks, thus preventing slipping or loss of the picks during sustained performances. Experiments using the present invention solution have shown a performer to be able to play up to four (4) hours without the picks falling off or slipping and without re-application of the solution to his playing fingers or thumbs.

Another object of the present invention is to solve this problem of slipping or dropping picks by addressing the need for bonding at the finger or thumb level, rather than with the pick or picks as do other products used in attempts to solve the problem.[2] Picks with a rubber coating have been used in similar capacities as to other applications of rubber sleeves or coatings to a variety of commonly used implements to include tools and writing utensils[3]. In short, such rubber or like grips seek to assist the player by giving the picking fingers and thumb an improved surface with more texture upon which to grip and secure the pick. However, as there is no temporary bonding of the pick to the fingers and thumbs, the picks can still easily be dropped, especially when the musician perspires from extended periods of play or from performing under the hot lights of a stage.

[2] IDS, Patent Publications, Cites 6, 7, 8; IDS Non Patent Publications, Cites 1-3
[3] IDS, Patent Publications, Cite 5

Other inadequate pick modifications include musicians cutting ridges into picks or even taping sandpaper to their picks to provide more texture to the otherwise smooth plastic or metal pick surface for a better grip[4]. As with rubber coatings, such solutions again fail to temporarily bind the picks to the player's fingers and thumbs and therefore fail to adequately protect against the pick falling off the finger or thumb. Likewise, such modifications or alterations have resulted in inconsistent performance under extremes in temperatures, as experienced by musicians performing outdoors.

[4] IDS, Non Patent Literature, Cites 1,2

Another object of the present invention is to provide superior adhesion, while still quickly evaporating from a musician's fingers and thumb in areas of the skin where adhesion is not needed. The present invention provides adhesion only between the metal or plastic picks and the player's skin in contact with those picks. Any remaining solution on a player's fingers or thumb quickly evaporates. Ointments, such as petroleum jelly, have a shortened period of adhesion, if any. More importantly, oil-based ointments or lubricants leave a residue on the player's fingers, both those used with picks and those used to apply the ointment itself. These ointments often require repeated application and subsequent wiping of fingers and thumbs to provide any adhesive benefit. Such application and wiping interrupt a musician's work and can delay the start of performances, something that can prove harmful to a professional musician's career and reputation. These ointments and solutions have also performed inconsistently under extremes in temperature or humidity, as experienced by musicians performing outdoors. Lastly, some such ointments can also irritate and dry the skin after repeated applications.

Another object of the present invention is to provide superior adhesion without the loss of finger and thumb sensitivity to the instrument's performance, especially the response of the strings to plucking. Although it does adhere the pick to the fingers and thumb adequately for short periods of time, the application of tape or "moleskin"[5] causes the musician other performance problems to include tape and/or its adhesive component getting caught in the strings of the instrument, reducing sensitivity of the finger and thumb to the responsiveness of the instrument, and producing unwanted friction between the finger and thumb. These outcomes can result in the slowing the speed at which the musician can play. Furthermore, depending on the individual player, certain tapes or adhesive elements used with "moleskin" can cause skin irritation for those with sensitivities to certain glues or traditional adhesives.

[5] IDS, Non Patent Literature, Cite 2, Page 2.

Another object of the present invention is to provide this superior adhesion without irritating the player through the drying or cracking of his skin, leaving a residue on the player's fingers, or a persistent odor after application. Such a benefit enables a player to apply the solution before several performances in one day and avoid undue stoppage in a performance to re-apply or wipe off residue. Existing permanent glues, such as "Super Glue" have been used by musicians to secure picks to their fingers and thumb[6]; however, such use can have unwanted side effects to include damage to the skin, skin irritation, and others against which harms are specifically warned on the respective permanent adhesive product labels. Traditional adhesives, like "Super Glue", also leave a residue on human skin and have a strong odor. These effects prevent repeated, long-term use, such as that required of professional musicians, of such products.

[6] IDS, Non Patent Literature Cite 3

To achieve the objects of the present invention, an embodiment of the present invention is a water-based solution comprised of a mixture of water, gum arabic powder, denatured alcohol, sodium benzoate and citric acid. When applied to the playing fingers and thumbs prior to the use of picks, the present invention enables the picks to be temporarily bonded to the musician's fingers in less than a minute's time, yet enables him to play for extended periods of time without dropping his picks nor having the picks fall off while still providing no loss of sensitivity, irritation of the skin or need for repeated applications.

BRIEF DESCRIPTION OF THE DRAWINGS

FIG. 1 shows one embodiment of the completed invention in its application bottle, here with a sponge applicator.

FIG. 2 shows finger picks (2*a*) and a thumb pick (2*b*).

DETAILED DESCRIPTION OF THE INVENTION

Figure 3:
FIG. 3 shows the application of the solution to the player's fingers and thumb.

The present invention and its method of composition will now be described more fully hereinafter with reference to the accompanying figures, in which some examples of the embodiments of the inventions are shown. Indeed, this invention may be embodied in many different forms and should not be construed as limited to the embodiments set forth herein; rather, these embodiments are provided by way of example so that this disclosure will satisfy applicable legal requirements and disclosure the preferred embodiment and best mode of the invention.

1. Composing the Solution.

The water-based solution requires five (5) ingredients to complete its composition. For this disclosure, a forty-two (42) ounce sample is used for the preferred embodiment and best mode of the invention. Where noted, other ingredients or applications can be used to facilitate alternate embodiments, all of which a person having ordinary skill in the art would comprehend.

Each of the following ingredients is added to a plastic or glass mixing container to complete the composition. The order in which the ingredients are added is immaterial to the successful completion of the composition.

(a) Four (4) cups (32 ounces) water. Water serves as the base for the solution. While distilled water is presented in the preferred embodiment of the invention, ordinary tap water can also be used. In any embodiment, water comprises 74.9% of the total solution.

(b) One and one-third (1⅓) cup (10.4 ounces) gum arabic powder or acacia. Gum arabic powder, when combined with the water, provides the adhesive property to the invention. The gum arabic powder used in the invention is commonly available in commercial outlets such as hardware stores and supermarkets. In any embodiment, gum arabic powder comprises approximately 18.73% of the total solution.

(c) One-third (⅓) cup (2.64 ounces) denatured alcohol. Denatured alcohol serves two purposes in the invention, that of evaporative agent and solution preservative. Denatured alcohol is commonly available in hardware stores, marine shops and other commercial outlets. In any embodiment, denatured alcohol comprises approximately 6.18% of the total solution.

(d) One-quarter (¼) teaspoon (0.038 ounces) sodium benzoate. Sodium benzoate serves to preserve the solution and is a commonly available food additive. In any embodiment, sodium benzoate comprises approximately 0.09% of the total solution.

(e) One-quarter (¼) teaspoon (0.038 ounces) citric acid. Citric acid serves to stabilize the sodium benzoate in the solution. Citric acid is commonly available in agricultural stores and garden centers. In any embodiment, citric acid comprises 0.09% of the total solution.

The water, gum arabic powder, denatured alcohol, sodium benzoate and citric acid are added to the container and thoroughly blended using a mechanical blender, such as a kitchen blender, to create a solution of consistent composition throughout. In its preferred embodiment, the solution should be blended continuously for no less than two (2) minutes. Once the blending is completed, the solution will have a white, creamy appearance in color. The solution should be allowed to stand for no less than forty-eight (48) hours to allow for any foam generated during the blending to properly settle into the solution. After the forty-eight (48) hours have elapsed, the solution will have a color similar to that of honey in appearance.

Once the mixture is complete, the solution can be poured into a plastic or glass bottle for storage and application. In the preferred embodiment, the solution is stored and applied in a plastic bottle with sponge applicator as shown in FIG. 1. However, the solution can be produced in larger or small sample sizes, provided the components are used in the proper proportional relationship to the total volume of the solution. A person having ordinary skill in the art will understand how to manipulate the individual amounts of each component while keeping the same relative percentages of each ingredient to create larger or smaller sample sizes.

2. Solution Application and Use.

Figure 4:
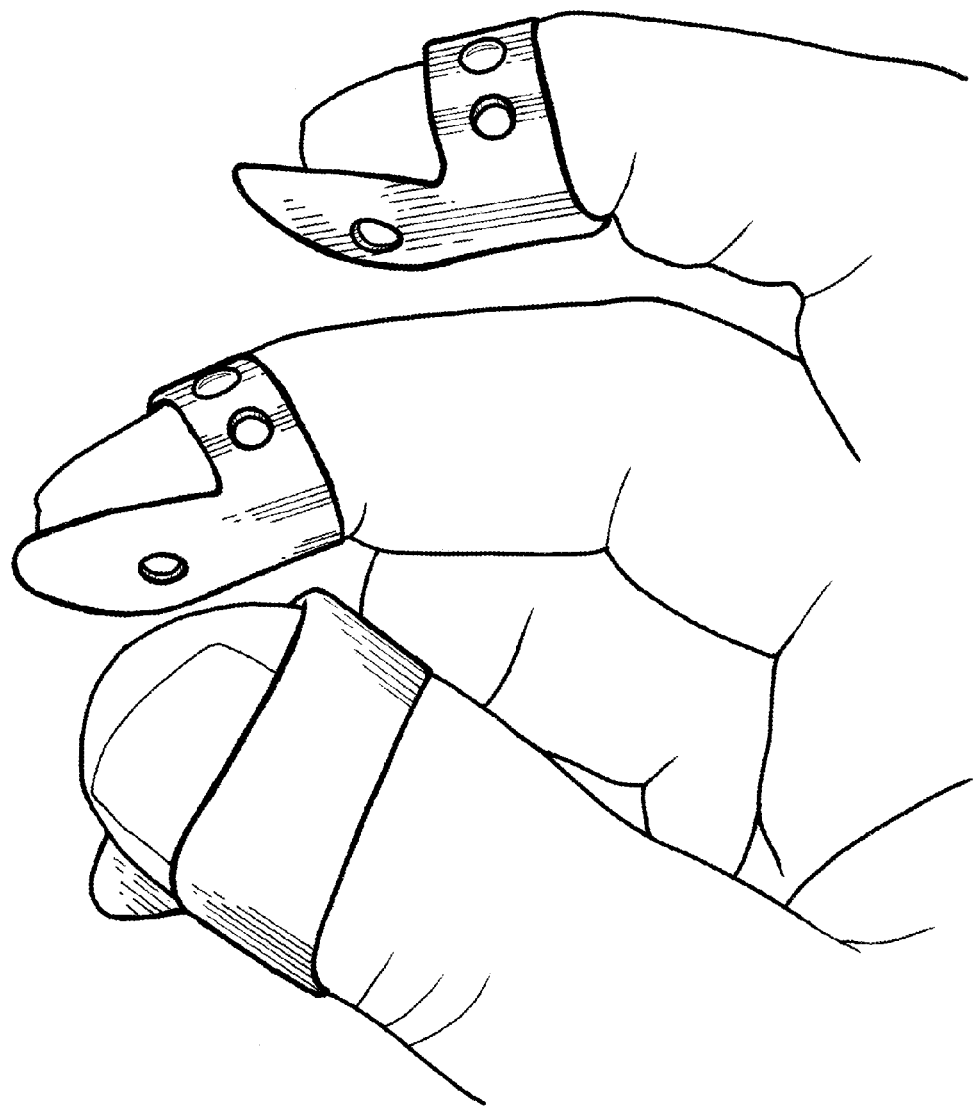
FIG. 4 shows the picks adhered to the player's fingers and thumb after application of the invention.

When ready to play, the user of the present invention applies a small amount of the solution to his picking finger(s) and thumb as shown in Drawing 3. Using any plastic or metal picks of his preference which have been previously shaped to fit his picking finger(s) (FIG. 2*a*) and thumb (FIG. 2*b*), the musician then places the picks on his playing fingers and thumb while each are still moist from the application of the solution. The musician then leaves the picks in place for thirty (30) to sixty (60) seconds, without playing, to allow the solution to dry and seal the picks to his fingers and thumb (FIG. 4). Drying time may vary slightly dependent upon ambient conditions such as humidity or temperature. Upon completion of the appropriate drying time, the musician can commence playing of an instrument.

What is claimed is:

1. A water-based, non-permanent adhesive solution for individual, personal use on one's fingers and thumbs comprising a mixture:

(a) Four (4) cups (32 ounces) water;

(b) One and one-third (1⅓) cup (10.4 ounces) gum arabic powder or acacia;
(c) One-third (⅓) cup (2.64 ounces) denatured alcohol;
(d) One-quarter (¼) teaspoon (0.038 ounces) sodium benzoate; and
(e) One-quarter (¼) teaspoon (0.038 ounces) citric acid.

2. A water-based non-permanent adhesive solution as claimed in claim 1 in which the solution is stored and applied to fingers and thumbs with a bottle with a sponge applicator cap.

3. A water-based non-permanent adhesive solution as claimed in claim 1 produced and packaged in bulk or other total volumes.

4. A water-based temporary non-permanent adhesive solution as claimed in claim 1 in which the solution is packaged in bottles with screw caps.

5. A water-based temporary non-permanent adhesive solution as claimed in claim 1 in which the solution is packaged in bottles with lids.

6. A water-based, non-permanent adhesive solution for individual, personal use on one's fingers and thumbs comprising:
   a range of 70 percent to 75 percent water;
   a range of 18 percent to 23 percent of either gum arabic powder or acacia;
   up to about 6 percent denatured alcohol;
   less than 1 percent sodium benzoate; and
   less than one percent citric acid.

7. A water-based, non-permanent adhesive solution comprising:
   a solution comprising a mixture of:
      water;
      an evaporating agent;
      a preservative; and
      at least one of gum Arabic powder and acacia that provides an adhesive property in combination with the water;
   which are formulated in an effective amount such that:
      when the solution is applied to the skin of a user, a non-permanent adhesive bond is formed in areas between the user's skin to which the solution is applied and an opposing surface brought into contact with the user's skin to which the solution is applied, and
      the mixture evaporates from the user's skin in areas not in contact with the opposing surface.

8. The water-based, non-permanent adhesive solution of claim 7, wherein:
   the water comprises distilled water.

9. The water-based, non-permanent adhesive solution of claim 7, wherein:
   the evaporating agent is denatured alcohol.

10. The water-based, non-permanent adhesive solution of claim 7, wherein:
    the preservative comprises a mixture of sodium benzoate and citric acid in sufficient concentrations to serve to preserve the solution.

11. The water-based, non-permanent adhesive solution of claim 7, wherein:
    in which the solution is stored and applied to fingers and thumbs with a bottle with a sponge applicator cap.

12. The water-based, non-permanent adhesive solution of claim 7, wherein:
    the solution is formulated in an effective amount such that the mixture evaporates from the user's skin in areas not in contact with the opposing surface in less than one minute.

\* \* \* \* \*